United States Patent
Tanaka et al.

(10) Patent No.: US 7,697,723 B2
(45) Date of Patent: Apr. 13, 2010

(54) IMAGE RECOGNITION DEVICE

(75) Inventors: Shoji Tanaka, Tokyo (JP); Makoto Otsuru, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 867 days.

(21) Appl. No.: 11/528,449

(22) Filed: Sep. 28, 2006

(65) Prior Publication Data

US 2007/0076951 A1 Apr. 5, 2007

(30) Foreign Application Priority Data

Oct. 5, 2005 (JP) ............................. 2005-292525
Feb. 1, 2006 (JP) ............................. 2006-024086

(51) Int. Cl.
*G06K 9/00* (2006.01)
*H04H 60/32* (2008.01)

(52) U.S. Cl. ..................................... 382/103; 725/19

(58) Field of Classification Search ................. 382/103, 382/159, 165, 170, 181; 348/206, 262, 264, 348/266; 358/474, 484, 489, 505, 506; 725/19
See application file for complete search history.

(56) References Cited

U.S. PATENT DOCUMENTS

| | | | | |
|---|---|---|---|---|
| 5,287,275 A | * | 2/1994 | Kimura | ......................... 707/5 |
| 2006/0110029 A1 | * | 5/2006 | Kazui et al. | ................. 382/159 |

FOREIGN PATENT DOCUMENTS

| | | |
|---|---|---|
| JP | 7-298161 A | 11/1995 |
| JP | 10-23347 A | 1/1998 |
| JP | 11-75088 A | 3/1999 |
| JP | 2000-99724 A | 4/2000 |
| JP | 2003-162715 A | 6/2003 |

* cited by examiner

*Primary Examiner*—Abolfazl Tabatabai
(74) *Attorney, Agent, or Firm*—Birch, Stewart, Kolasch & Birch, LLP

(57) ABSTRACT

In order to reduce the computational burden required for scanning and to enhance the recognition accuracy, an image recognition device is configured so that a scanning pattern recording unit that records a plurality of scanning patterns for directing how to scan recognition areas of predetermined size in the image data is included, and different scanning patterns for successive frames are read out from the scanning pattern recording unit and applied to scan the recognition areas.

19 Claims, 8 Drawing Sheets

Fig. 4

| | | |
|---|---|---|
| USED SCANNING PATTERN NUMBER | 3 | |
| SCANNING PATTERN ORDER | 1,2,3 | |
| SCANNING PATTERNS | | |
| PATTERN ID | 1 | |
| COORDINATE NUMBER | 20 | |
| COORDINATE TABLE | x1-1 | y1-1 |
| | x1-2 | y1-2 |
| | ... | ... |
| | x1-20 | y1-20 |
| PATTERN ID | 2 | |
| COORDINATE NUMBER | 16 | |
| COORDINATE TABLE | x2-1 | y2-1 |
| | x2-2 | y2-2 |
| | ... | ... |
| | x2-16 | y2-16 |
| PATTERN ID | 3 | |
| COORDINATE NUMBER | 20 | |
| COORDINATE TABLE | x3-1 | y3-1 |
| | x3-2 | y3-2 |
| | ... | ... |
| | x3-20 | y3-20 |

Fig. 5

| 1 | | 2 | | 3 | | 4 | |
|---|---|---|---|---|---|---|---|
| | | | | | | | |
| 5 | | 6 | | 7 | | 8 | |
| | | | | | | | |
| 9 | | 10 | | 11 | | 12 | |
| | | | | | | | |
| 13 | | 14 | | 15 | | 16 | |
| | | | | | | | |
| 17 | | 18 | | 19 | | 20 | |
| | | | | | | | |

Fig. 6

| 1 | | 2 | | 3 | | 4 | |
|---|---|---|---|---|---|---|---|
| | | | | | | | |
| 5 | | 6 | | 7 | | 8 | |
| | | | | | | | |
| 9 | | 10 | | 11 | | 12 | |
| | | | | | | | |
| 13 | | 14 | | 15 | | 16 | |
| | | | | | | | |
| | | | | | | | |

Fig. 7

| 20 | | 17 | | 18 | | 19 | |
|---|---|---|---|---|---|---|---|
| | | | | | | | |
| 16 | | 10 | | 5 | | 11 | |
| | | | | | | | |
| 15 | | 4 | | 1 | | 6 | |
| | | | | | | | |
| 14 | | 3 | | 2 | | 7 | |
| | | | | | | | |
| 13 | | 9 | | 8 | | 12 | |
| | | | | | | | |

Fig. 10

| 10 | 6 | 5 | 11 | 89 | 122 | 138 | 153 |
|---|---|---|---|---|---|---|---|
| 12 | 3 | 0 | 44 | 172 | 187 | 183 | 194 |
| 17 | 1 | 7 | 123 | 187 | 155 | 120 | 87 |
| 4 | 0 | 58 | 185 | 175 | 157 | 129 | 93 |
| 1 | 0 | 119 | 206 | 171 | 190 | 199 | 200 |
| 1 | 8 | 165 | 202 | 167 | 156 | 120 | 92 |
| 1 | 47 | 205 | 211 | 177 | 101 | 61 | 31 |
| 16 | 97 | 222 | 221 | 208 | 204 | 176 | 137 |
| 100 | 123 | 220 | 223 | 219 | 208 | 184 | 167 |
| 147 | 166 | 214 | 222 | 217 | 201 | 190 | 184 |

Fig. 11

| 10 | 16 | 21 | 32 | 121 | 243 | 381 | 534 |
|---|---|---|---|---|---|---|---|
| 22 | 31 | 36 | 91 | 352 | 661 | 982 | 1329 |
| 39 | 49 | 61 | 239 | 687 | 1151 | 1592 | 2026 |
| 43 | 53 | 123 | 469 | 1119 | 1740 | 2310 | 2837 |
| 44 | 54 | 243 | 822 | 1816 | 2427 | 3196 | 3923 |
| 45 | 63 | 417 | 1198 | 2159 | 3126 | 4015 | 4834 |
| 46 | 111 | 670 | 1662 | 2800 | 3868 | 4818 | 5668 |
| 62 | 224 | 1005 | 2218 | 3564 | 4836 | 5962 | 6949 |
| 162 | 447 | 1448 | 2884 | 4449 | 5929 | 7239 | 8393 |
| 309 | 760 | 1975 | 3633 | 5415 | 7096 | 8596 | 9934 |

Fig. 12

IMAGE RECOGNITION DEVICE

BACKGROUND OF THE INVENTION

1. Field of the Invention

The present invention relates to an image recognition device for performing recognition processes to detect presence of a target object.

2. Description of the Related Art

In a conventional image recognition device, in order to speed up its recognition processes by skipping pixels in image data, the number of pixels skipped in the recognition processes, which is referred to as the skipping distance hereinafter, is configured in accordance with the size of a recognition target, and an image in a recognition area has been scanned with the configured skipping distance (see, for instance, Japanese Patent Laid-Open No. 99724/2000 (FIG. 2)).

In addition, in the conventional image recognition device, in order to enhance detection-accuracy tolerance to luminance variations, a normalization process such as luminance tone adjustment is performed on the whole image or the recognition area within the image data. In order to calculate parameters for the normalization process, feature quantities such as pixel values of the whole image or in the recognition area are obtained. It then corrects the pixel values by using a look-up table or an equation that represents a luminance tone-curve.

In the conventional image recognition device, once the skipping distance has been set, it remains fixed intact. Therefore, a problem has been that cases may occur in which a recognition target cannot be found when the recognition target is present within the skipping distance.

Another problem of the conventional image recognition device has been that an algorithm used in the normalization process that corrects pixel values of the whole image or in the recognition area is fixed, and the amount of computations cannot be neglected when the number of pixels increases.

SUMMARY OF THE INVENTION

An image recognition device according to the present invention has been made to resolve the problems as described above, and includes: an image data input unit for inputting image data frame by frame; a feature quantity calculating unit for calculating a feature quantity of the inputted image data; a normalization processing unit for normalizing the image data based on its feature quantity; a scanning pattern recording unit for recording a plurality of scanning patterns that directs how to skip pixels within recognition areas in the image data; a scanning pattern assigning unit for assigning one of the scanning patterns to each frame; a scanning unit for scanning recognition areas within each frame according to the scanning pattern assigned to that frame by the scanning pattern assigning unit; and a checking unit for checking the image data within the recognition areas scanned by the scanning unit against model data of a recognition target, and outputting the checking result.

The present invention includes a scanning pattern recording unit containing a plurality of scanning patterns that directs how to skip pixels in the image data while scanning. As a result, computation amount required for the recognition processes per frame can be reduced. In addition, skipped pixels specified in a scanning pattern can be covered by another scanning pattern, so that recognition accuracy can be enhanced.

BRIEF DESCRIPTION OF THE DRAWINGS

FIG. 4 is a diagram illustrating scanning patterns in a scanning pattern recording unit.

FIG. 5 is a diagram illustrating an order of scanning recognition areas.

FIG. 6 is a diagram illustrating another order of scanning recognition areas.

FIG. 7 is a diagram illustrating another order of scanning recognition areas.

FIG. 10 is a diagram illustrating pixel values of image data.

FIG. 11 is a diagram illustrating accumulated image data.

FIG. 12 is a diagram illustrating a state in which a recognition area is set on image data.

DETAILED DESCRIPTION OF THE PREFERRED EMBODIMENTS

Embodiment 1

Figure 1:
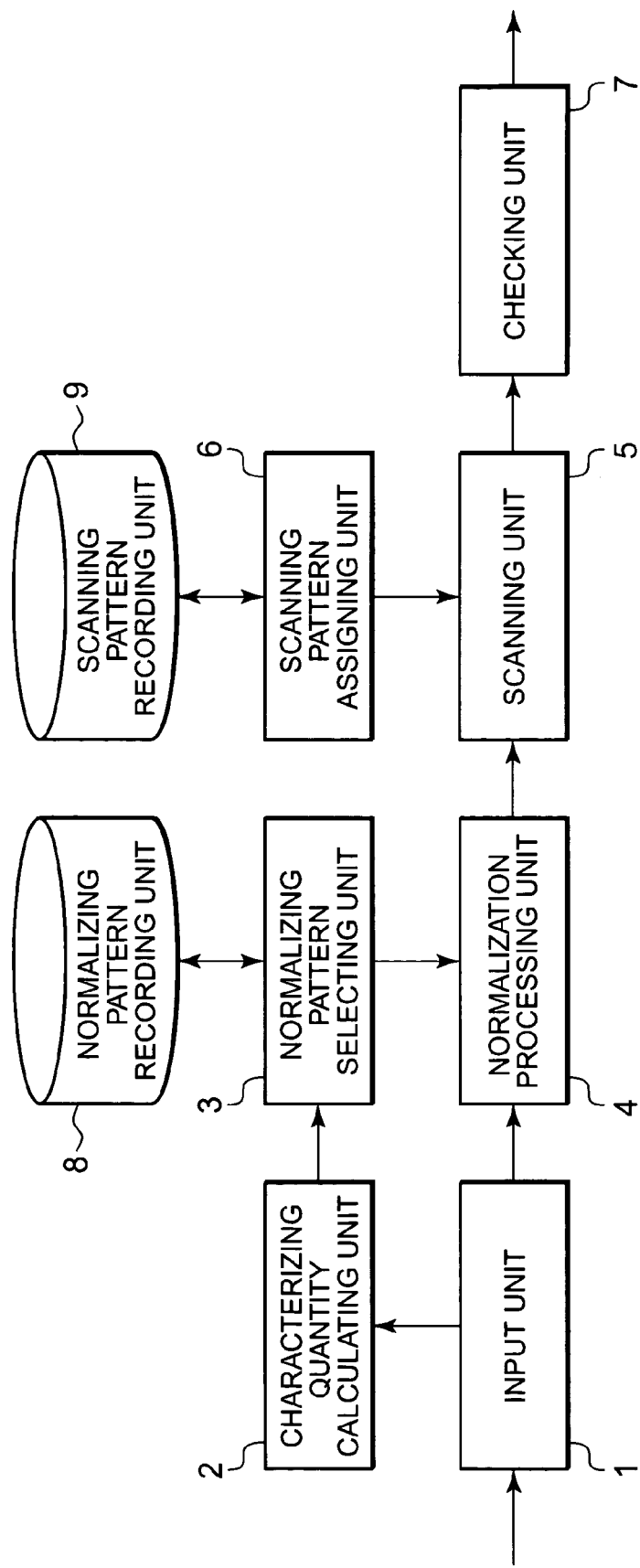
FIG. 1 is a block diagram illustrating an image recognition device in Embodiment 1 of the present invention.

FIG. 1 is a block diagram of an image recognition device in Embodiment 1 for implementing the present invention. In FIG. 1, image data inputted to an input unit 1 by digitizing a video signal from an imaging device not shown in the figure is transferred to a feature quantity calculating unit 2 and to a normalization processing unit 4. The feature quantity calculating unit 2 calculates a feature quantity such as the mean or the variance of all pixel values of the image data frame by frame, and transfers the feature quantity to a normalizing pattern selecting unit 3. In a normalizing pattern recording unit 8, a look-up table including a plurality of kinds of normalizing patterns is recorded. The normalizing pattern selecting unit 3 refers to the look-up table recorded in the normalizing pattern recording unit 8, and selects a normalizing pattern that corresponds to the feature quantity calculated by the feature quantity calculating unit 2, to develop the normalizing pattern in a memory (not shown in the figure). The normalization processing unit 4 normalizes the image data by using the normalizing pattern developed in the memory. A scanning pattern assigning unit 6 assigns scanning patterns in a scanning pattern recording unit 9 frame by frame. A scanning unit 5 scans recognition areas based on the scanning patterns assigned by the scanning pattern assigning unit 6. A checking unit 7 checks image data in the recognition areas scanned by the scanning unit 5 against model data for a recognition target, and outputs the checking results.

Figure 2:
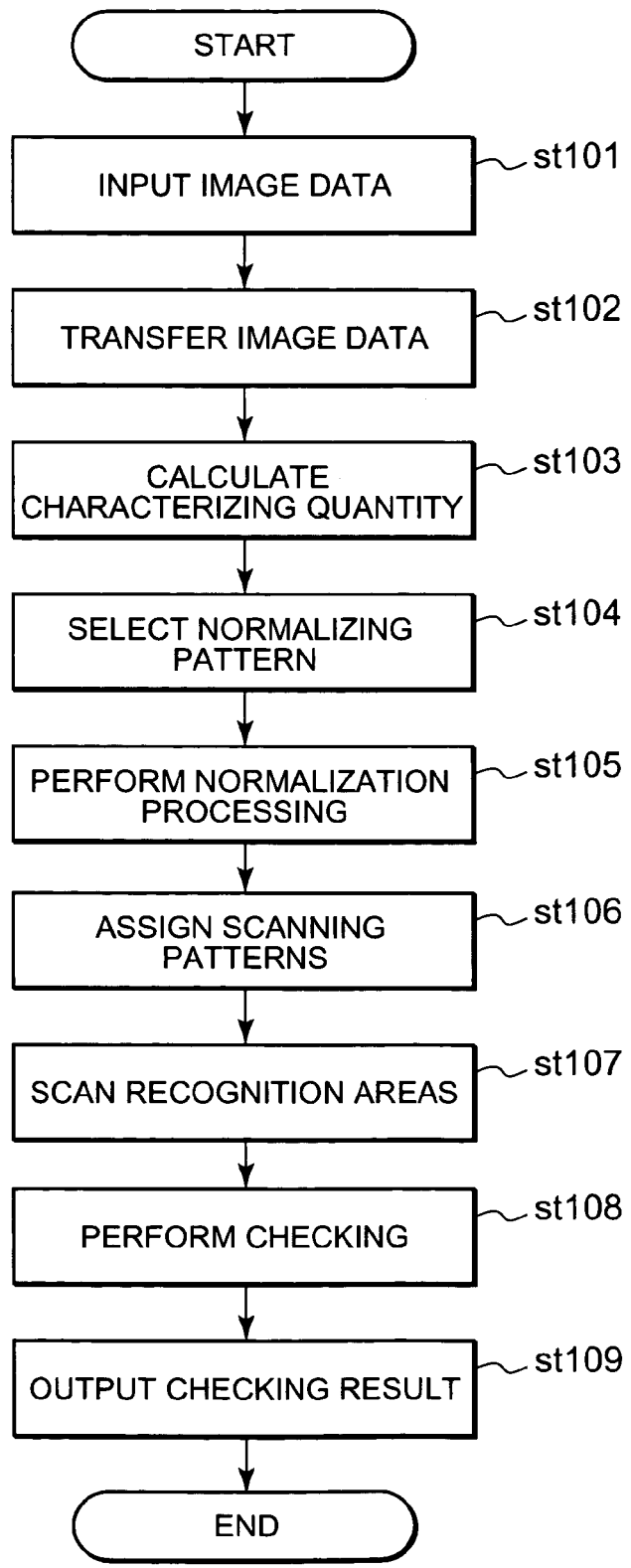
FIG. 2 is a flow diagram illustrating operations of the image recognition device in Embodiment 1 of the present invention.

Next, operations of the image recognition device configured as above will be described using FIG. 2. FIG. 2 is a flow diagram that illustrates the operations of the image recognition device in the present Embodiment 1. Firstly, image data is inputted to the input unit 1 frame by frame (st101). The image data for each frame, inputted to the input unit 1, is transferred to the feature quantity calculating unit 2 and to the normalization processing unit 4 (st102). The feature quantity calculating unit 2 calculates a feature quantity of the transferred image data for each frame (st103). Here, a case in which the mean value of all pixel values in the image data is calculated as a feature quantity will be described. However, the variance, a histogram, the minimum value, the maximum value, or the like, of pixel values can be used as a feature quantity. Moreover, it is assumed here that each pixel value of image data is expressed by an 8-bit number from 0 to 255. Furthermore, it is assumed that the mean pixel value as a feature quantity is defined as an integer type, and that the fractional part is rounded off to an integer value from 0 to 255.

Figure 3:
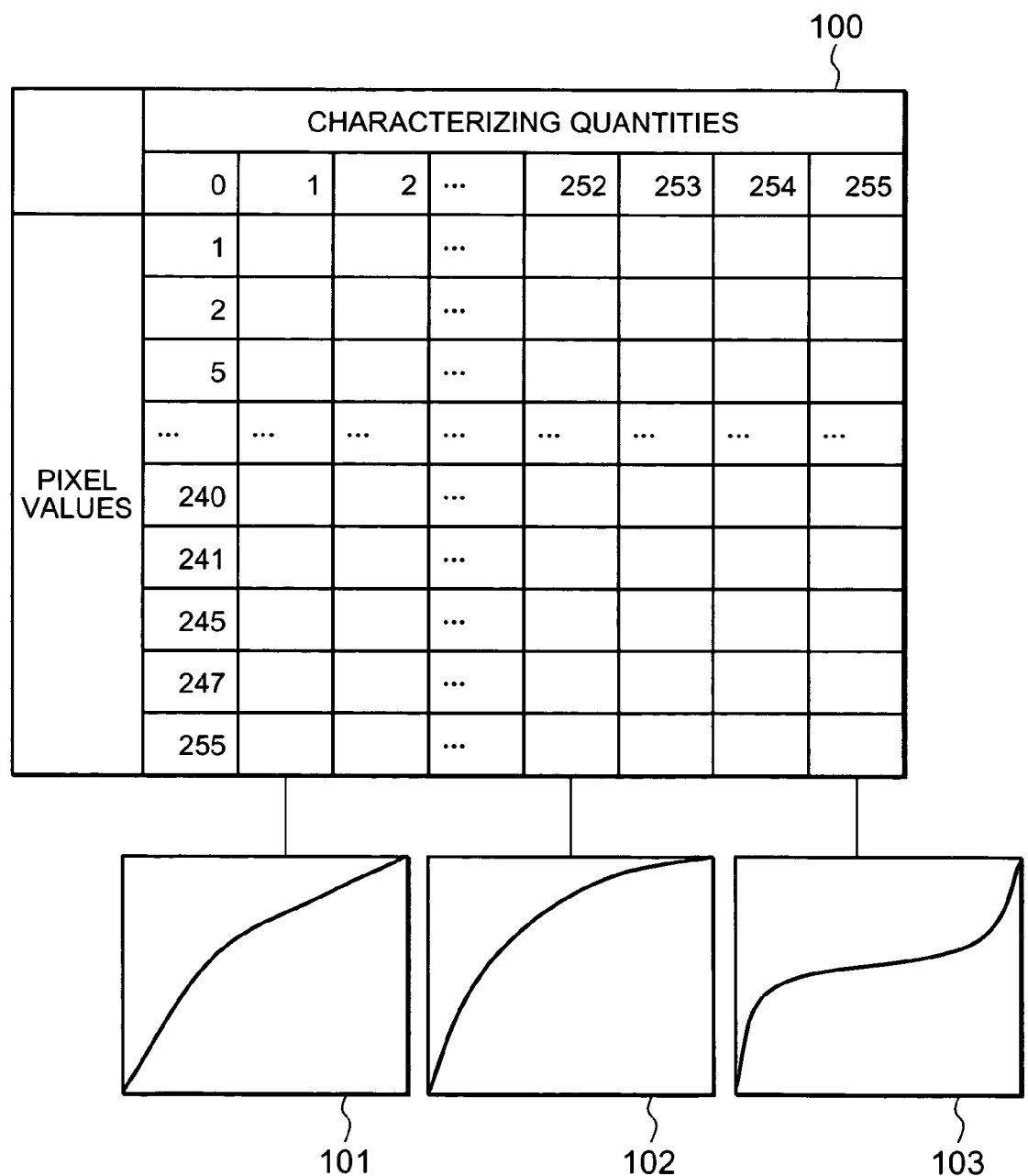
FIG. 3 is a diagram illustrating a look-up table in a normalizing pattern recording unit.

The normalizing pattern selecting unit 3 selects a normalizing pattern corresponding to the feature quantity calculated by the feature quantity calculating unit 2 by referring to a look-up table recorded in the normalizing pattern recording unit 8 (st104). In FIG. 3, a look-up table for a case in which the mean pixel value is used for a feature quantity recorded in the normalizing pattern recording unit 8 is illustrated. In FIG. 3, in the look-up table 100, a plurality of kinds of normalizing patterns corresponding to feature quantities from 0 to 255 are recorded. Each normalizing pattern can be formed by combining several kinds of functions. Patterns in accordance with feature quantities are formed in advance by combining, for example, a linear function, a quadratic function, a trigonometric function, and an exponential function. For example, when the feature quantity calculated by the feature quantity calculating unit 2 is 0, a normalizing pattern 101 is selected; when the feature quantity is 252, a normalizing pattern 102 is selected; and when the feature quantity is 255, a normalizing pattern 103 is selected. Then the selected normalizing pattern is developed in the memory. In the normalizing patterns 101, 102, and 103, the horizontal axis indicates pixel values before performing the normalization process, and the vertical axis indicates pixel values after performing the normalization process.

Moreover, when the pixel variance value is used as a feature quantity, in the same manner as in the case of the mean value described above, it is only necessary to have created a look-up table including normalizing patterns in accordance with the variance values.

Next, the normalization processing unit 4 performs the normalization process by converting pixel values of the image data using the normalizing pattern selected by the normalizing pattern selecting unit 3 and then developed in the memory (st105). Thus, by recording normalizing patterns, which express results of converting in advance pixel values in accordance with feature quantities of the image data, as a look-up table in the normalizing pattern recording unit 8, it is not necessary to perform computational processing in the normalization process. In addition, the normalizing pattern selecting unit 3 selects normalizing patterns in accordance with feature quantities, so that variations in lighting during imaging can be flexibly dealt with.

Next, the scanning pattern assigning unit 6 assigns scanning patterns as recorded in the scanning pattern recording unit 9 (st106). The scanning unit 5 scans recognition areas according to the scanning patterns (st107).

Hereinafter, scanning methods for the recognition area will be described. In the scanning pattern recording unit 9, as illustrated in FIG. 4, the number of scanning patterns to be used, a scanning pattern order, and scanning patterns are recorded. The scanning pattern order indicates the order of using the scanning patterns. In addition, each of the scanning patterns is composed of a pattern ID, the number of coordinates, and a coordinate table. The pattern ID indicates an ID for identifying each scanning pattern, and the number of coordinates indicates how many recognition areas are applied to image data for each frame. Moreover, the coordinate table includes the number of coordinate values expressing x and y coordinates in the image data, and each coordinate value indicates the position of each recognition area in the image data.

The scanning unit 5 scans recognition areas with respect to the normalized image data using scanning patterns with their IDs designated by the scanning pattern order. Here, for explanatory convenience, a case will be described in which the number of scanning patterns to be used is 3, the scanning pattern order is the order of 1, 2, and 3, the image data size for each frame is 80 pixels—8 horizontal by 10 vertical pixels, and the size of each recognition area is 4 pixels (2 horizontal by 2 vertical pixels). However, these values can be appropriately designated.

Because the head of the scanning pattern order is 1, with respect to image data of the firstly inputted frame, the scanning unit 5 performs scanning of recognition areas based on a scanning pattern 21 whose pattern ID is 1. Moreover, with respect to the image data of the next inputted frame, the scanning of recognition areas is performed based on a scanning pattern 22 whose pattern ID is 2, and with respect to the image data of the next succeeding inputted frame, the scanning of recognition areas is performed based on a scanning pattern 23 whose pattern ID is 3. As described above, the scanning of recognition areas is performed based on the designated scanning patterns in the order designated in the scanning pattern order.

FIG. 5 is a diagram illustrating a scanning order when performing the scanning of recognition areas according to the scanning pattern 21. Each block in FIG. 5 indicates a pixel in the image data. Pixels with numerals indicate that they are pointed by the coordinate values in the coordinate table. In addition, the order of the numerals corresponds to the order of coordinate values in the coordinate table. Specifically, the first coordinate value (x1-1, y1-1) in the coordinate table in the scanning pattern data 21 is the coordinate of the pixel with numeral 1, in the image data, and the next coordinate value (x1-2, y1-2) is the coordinate of the pixel with numeral 2, in the image data. Here, because the number of coordinates in the scanning pattern 21 is 20, numerals from 1 through 20 are attached to pixels in the image data.

Next, the scanning unit 5 performs scanning of the recognition areas in order of the recorded coordinate values in the coordinate table. In this case, each coordinate value indicates the coordinate of the upper-left end of each recognition area. Firstly, a recognition area in a shaded area in which the upper-left end of the recognition area is on the position indicated by numeral 1 in FIG. 5 is recognized. Next, a recognition area in which the upper-left end of the recognition area is on the position indicated by numeral 2 is recognized. These operations are repeated a number of times equal to the number of coordinates, 20 times in this case, to perform the scanning of recognition areas.

Then, with respect to image data for the next frame, the scanning unit 5 repeats similar operations according to the scanning pattern 22, to perform the scanning of the recognition areas. FIG. 6 illustrates a scanning order when performing the scanning of recognition areas according to the scanning pattern 22. Obviously seen from FIG. 6, in the scanning pattern 22, the number of coordinates is 16, and coordinate values (x2-1, y2-1) through (x2-16, y2-16) in the coordinate table are values that have been displaced downward by 1 pixel from coordinate values (x1-1, y1-1) through (x1-16, y1-16) in the coordinate table in the scanning pattern 21, respectively.

As described above, by performing scanning of recognition areas according to different scanning patterns with respect to consecutive frames, pixels skipped out in a scanning pattern can be covered by another scanning pattern, so that recognition accuracy can be enhanced.

Moreover, as illustrated in FIG. 7 for example, if a scanning pattern for scanning the recognition areas spirally from the center of the image data is recorded in the scanning pattern recording unit 9, an effective scanning order of recognition areas can be assigned because a recognition target is probably present around the center of the image. Thus, a user can designate the recognition-area scanning order in accordance with the user's purpose.

Furthermore, although a case in which the scanning pattern order is designated in advance has been described here, the order may not be specifically determined. More specifically, the device can be configured so that scanning patterns recorded in the scanning pattern recording unit 9 are selected at random.

Next, the checking unit 7 checks image data in the recognition areas scanned by the scanning unit 5 against model data for the recognition target (st108). Techniques for checking image data includes, for instance, a technique for calculating image correlations and the following technique.

For example, data trained from object features is extracted as characteristic features referred to as rectangle features (Rf). The object feature is expressed using a discrimination function, which is formed by combining rectangle features and is referred to as a classifier. Specifically, as expressed in Formula 1, a weight (pv or nv) is given depending on whether or not each rectangle feature value (Rf(i)) exceeds a threshold (th). Next, the total sum (Cls) of the weights of all the rectangle features is defined as expressed in Formula 2. As expressed in Formula 3, if the total sum exceeds a certain threshold (th2), then the image data is determined as a recognition target (object), and if the total sum does not exceed the threshold, then the image data is determined as a non recognition target (non-object). The determination result is outputted as the checking result (st109).

[Formula 1] (Formula 1)
$$Rf(i)_{i \in V} = \begin{cases} Rf(i) > th \rightarrow pv \\ Rf(i) \leq th \rightarrow nv \end{cases}$$

[Formula 2] (Formula 2)
$$Cls = \sum_{i \in V} Rf(i)$$

[Formula 3] (Formula 3)
$$\begin{cases} cls > th2 \rightarrow object \\ cls \leq th2 \rightarrow nonobject \end{cases}$$

In the image recognition device according to the present Embodiment 1, although gray-scale images, in which each pixel value of image data to be inputted is expressed by an 8-bit value from 0 to 255, have been described, the device can be applied to, for example, full-color images, in which each pixel value is expressed by 24 bits composed of an 8-bit R value, an 8-bit G value, and an 8-bit B value. In this case, when the mean value of pixel values is calculated as a feature quantity for image data in st103, in calculating the mean value of pixel values for each color and selecting a normalizing pattern in st104, by selecting different kinds of normalizing patterns in accordance with feature quantities for each color, similar effects can be achieved.

In addition, all the normalizing patterns in the look-up table recorded in the normalizing pattern recording unit 8 can be different from one another with respect to the feature quantities, or common normalizing patterns can be used for some ranges of feature quantities. As described above, by using common normalizing patterns for certain ranges of feature quantities, the memory capacity of the normalizing pattern recording unit 8 can be reduced.

Embodiment 2

Figure 8:
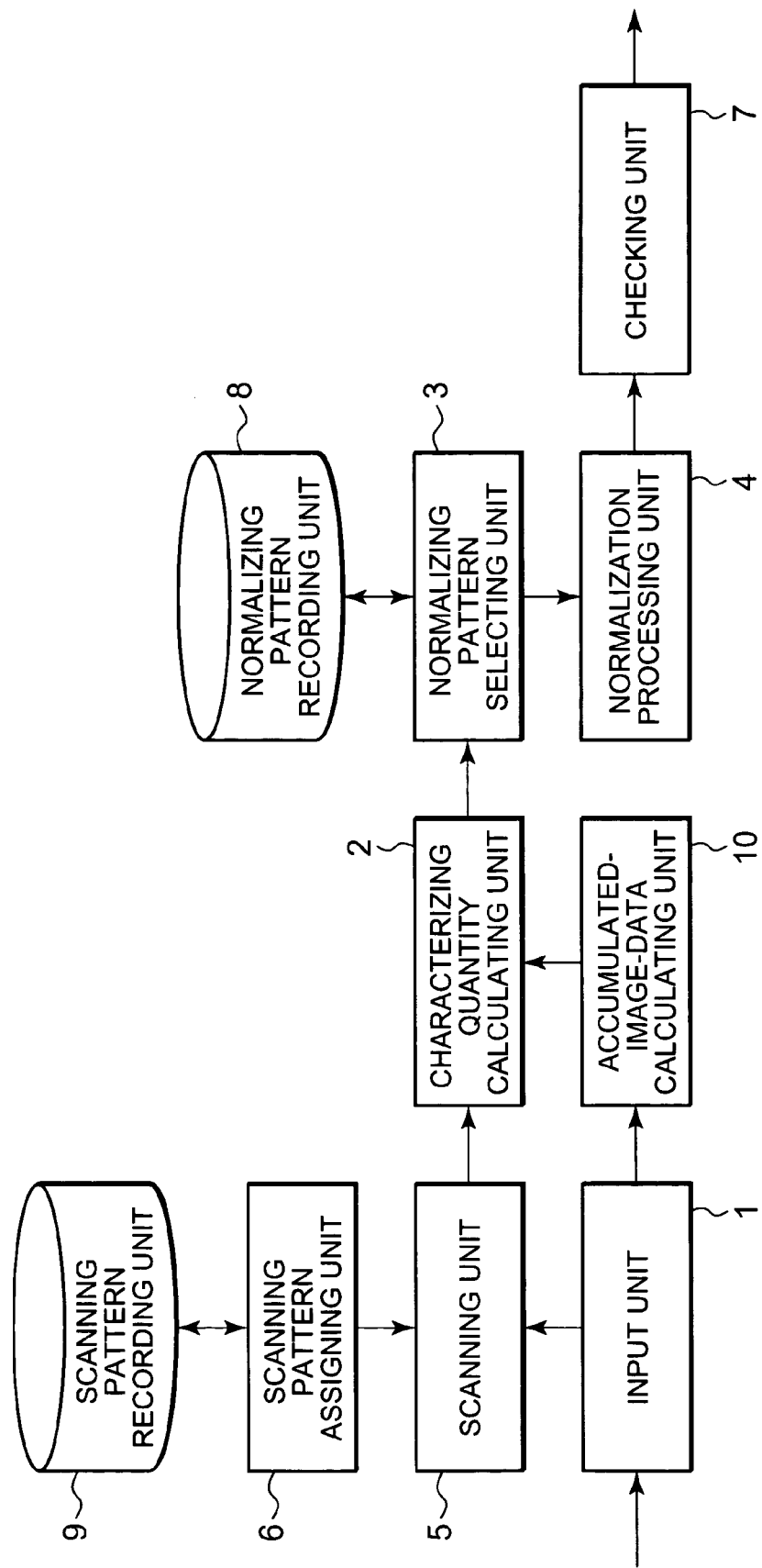
FIG. 8 is a block diagram illustrating an image recognition device in Embodiment 2 of the present invention.

FIG. 8 is a block diagram for an image recognition device in Embodiment 2 to implement the present invention, and identical numerals are attached to components corresponding to those in FIG. 1. In FIG. 8, image data inputted to the input unit 1 is transferred to the scanning unit 5 and an accumulated-image-data calculating unit 10. A scanning pattern assigning unit 6 assigns for each frame a scanning pattern in the scanning pattern recording unit 9, and the scanning unit scans recognition areas based on the assigned scanning pattern. In addition, the accumulated-image-data calculating unit 10 calculates accumulated image data from the image data for each frame. The feature quantity calculating unit 2 calculates feature quantities for the image data in a recognition area using the accumulated image data. The normalizing pattern selecting unit 3 refers to the look-up table recorded in the normalizing pattern recording unit 8, and selects a normalizing pattern corresponding to the feature quantity calculated by the feature quantity calculating unit 2, to develop the normalizing pattern in the memory (not illustrated in the figure). The normalization processing unit 4 normalizes image data in the recognition area using the normalizing pattern developed in the memory. The checking unit 7 checks the normalized image data against model data of a recognition target, and outputs the checking result.

Figure 9:
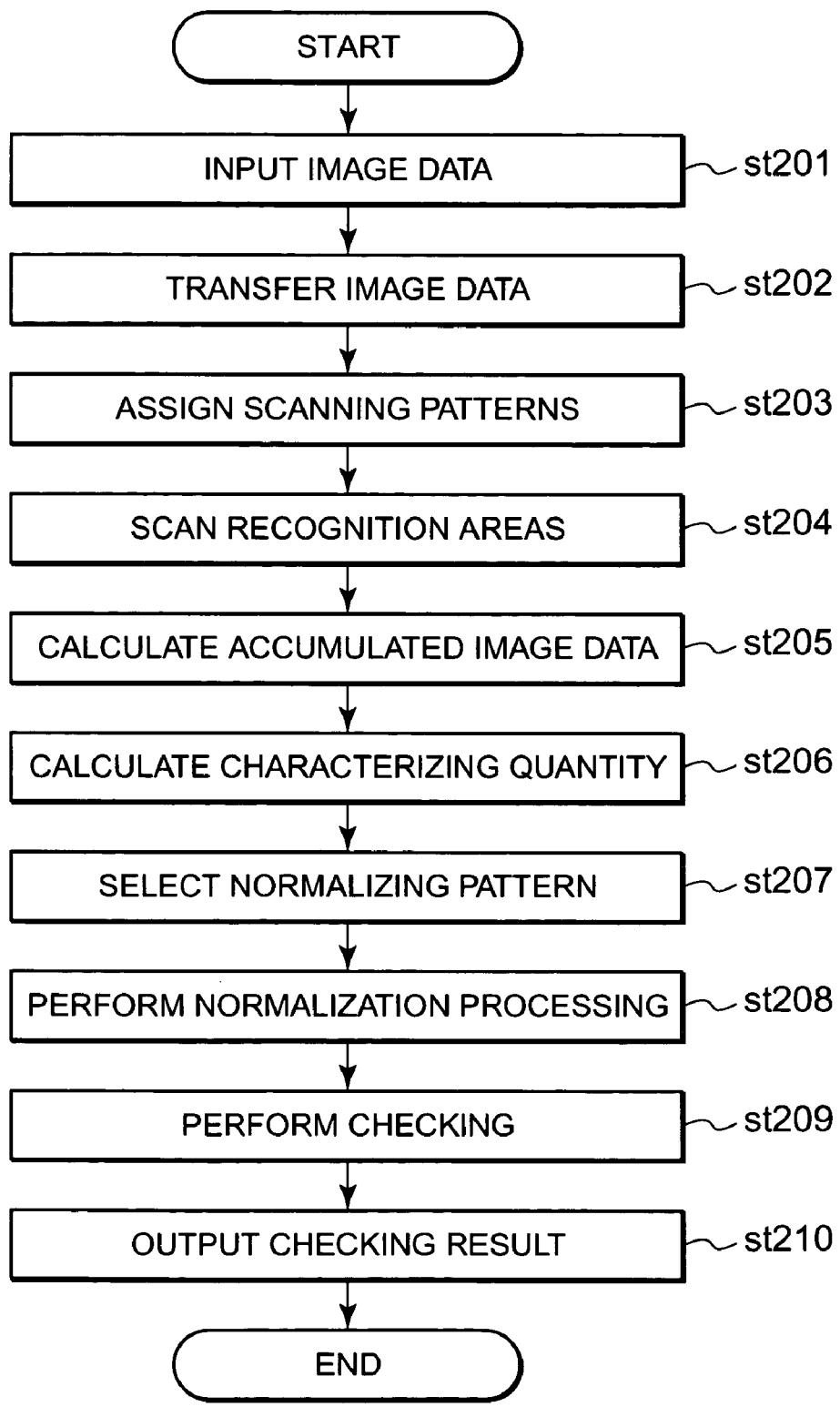
FIG. 9 is a flow diagram illustrating operations of the image recognition device in Embodiment 2 of the present invention.

Next, operations of the image recognition device configured as above will be described using FIG. 9. FIG. 9 is a flow diagram that illustrates the operations of the image recognition device in the present Embodiment 2. Firstly, image data is inputted frame by frame to the input unit 1 (st201). The image data inputted to the input unit 1 is transferred to the scanning unit 5 and to the accumulated-image-data calculating unit 10 (st202). The scanning pattern assigning unit 6 assigns, in the same manner as in st106 (see FIG. 2, the same applies to descriptions below), a scanning pattern according to the scanning patterns recorded in the scanning pattern recording unit 9 (st203). Moreover, in the same manner as in st107, the scanning unit 5 scans recognition areas according to the assigned scanning pattern (st204).

In the meantime, the accumulated-image-data calculating unit 10 calculates accumulated image data for the image data transferred from the input unit 1 (st205). Here, the accumulated image data is image data in which accumulated totals of pixel values are calculated horizontally and vertically with respect to the inputted image data. Given that pixel values in the original image data are expressed as I(x, y), pixel values in the accumulated image data I'(x, y) are expressed according to Formula 4.

[Formula 4] (Formula 4)
$$I'(x, y) = \sum_{x' \leq x} \sum_{y' \leq y} I(x', y')$$

For example, when the original image data has pixel values as illustrated in FIG. 10, the accumulated image data for the original image data is calculated as illustrated in FIG. 11.

Next, the feature quantity calculating unit 2 calculates the feature quantity for the image data in the recognition area using the accumulated image data (st206). Given that the mean pixel value is used for a feature quantity here, the sum of pixel values within the recognition area must be calculated. Here, it is assumed that the recognition area to be recognized by the recognition unit 5 is designated in a shaded area as illustrated in FIG. 12, and that coordinates of the pixels indicated by A, B, C, and D in the image data are $(x_A, y_A)$, $(x_B, y_B)$, $(x_C, y_C)$, and $(x_D, y_D)$, respectively. Then, the sum S of the pixel values within the recognition area can be calculated according to Formula 5.

[Formula 5]

$$S = I'(x_A, y_A) + I'(x_D, y_D) - (I'(x_B, y_B) + I'(x_C, y_C)) \quad \text{(Formula 5)}$$

Thus, using the accumulated image data makes it easy to calculate the sum of pixel values within an arbitrary rectangular area, so that computation amount in the feature quantity calculating unit 2 can be reduced.

Next, in the same manner as in st104, the normalizing pattern selecting unit 3 selects a normalizing pattern corresponding to the feature quantity calculated by the feature quantity calculating unit 2 by referring to the look-up table recorded in the normalizing pattern recording unit 8, to develop the normalizing pattern in the memory (st207). The normalization processing unit 4 performs the normalization process on the image data within the recognition area in the same manner as in st105 (st208). After that, in the same procedures as in st108 and st109, the checking unit 7 performs checking against the model data (st209), and outputs the checking result (st210).

An image recognition device in the present Embodiment 2 has an effect in that, by performing the normalization process on image data in recognition area units, tolerance to local illuminance change is enhanced, so that recognition accuracy can be enhanced.

Here, although a case in which the mean value of pixel values in the image data is used as a feature quantity has been explained in the present embodiment, the variance of pixel values can be used as a feature quantity. In this case, the accumulated image data is calculated in st205, and meanwhile each pixel value of the image data is squared and then accumulated horizontally and vertically to calculate accumulated square image data. And the variance value v of the pixel values within a recognition area can be calculated using the accumulated image data and the accumulated square image data. The variance value v can be calculated according to Formula 6.

[Formula 6]

$$v = \frac{1}{n} SS - \left(\frac{1}{n} S\right)^2 \quad \text{(Formula 6)}$$

In Formula 6, SS means the sum of accumulated square image data within a recognition area; S means the sum of the accumulated image data within the recognition area; and n means the total number of pixels within the recognition area.

Thus, even in a case in which the variance value of pixel values is used as a feature quantity, the computation amount in the feature quantity calculating unit 2 can be reduced.

What is claimed is:

1. An image recognition device comprising:
    an image data input unit for inputting image data frame by frame;
    a feature quantity calculating unit for calculating a feature quantity of the inputted image data;
    a normalization processing unit for normalizing the image data based on its feature quantity;
    a scanning pattern recording unit for recording a plurality of scanning patterns for directing how to skip pixels within recognition areas in the image data;
    a scanning pattern assigning unit for assigning one of the scanning patterns to each frame;
    a scanning unit for scanning recognition areas within each frame according to the scanning pattern assigned to that frame by the scanning pattern assigning unit; and
    a checking unit for checking the image data within the recognition areas scanned by the scanning unit against model data of a recognition target, and outputting the checking result.

2. An image recognition device comprising:
    an image data input unit for inputting image data frame by frame;
    a normalizing pattern recording unit for recording in advance a plurality of kinds of normalizing patterns corresponding to image-data feature quantities of image data;
    a feature quantity calculating unit for calculating a feature quantity of the inputted image data;
    a normalizing pattern selecting unit for selecting from the normalizing pattern recording unit a normalizing pattern corresponding to the feature quantity calculated by the feature quantity calculating unit;
    a normalization processing unit for normalizing the image data by using the normalizing pattern selected by the normalizing pattern selecting unit;
    a scanning unit for scanning the normalized image data in recognition-area units of predetermined size; and
    a checking unit for checking the image data within the recognition areas scanned by the scanning unit against model data of a recognition target, and outputting the checking result.

3. An image recognition device comprising:
    an image data input unit for inputting image data frame-by-frame;
    a normalizing pattern recording unit for recording in advance a plurality of kinds of normalizing patterns corresponding to feature quantities of image data;
    a feature quantity calculating unit for calculating a feature quantity of the inputted image data;
    a normalizing pattern selecting unit for selecting from the normalizing pattern recording unit a normalizing pattern corresponding to the feature quantity calculated by the feature quantity calculating unit;
    a normalization processing unit for normalizing the image data by using the normalizing pattern selected by the normalizing pattern selecting unit;
    a scanning pattern recording unit for recording a plurality of scanning patterns for directing how to skip pixels within recognition areas in the image data;
    a scanning pattern assigning unit for assigning one of the scanning patterns to each frame;
    a scanning unit for scanning recognition areas within each frame according to the scanning pattern assigned to that frame by the scanning pattern assigning unit; and
    a checking unit for checking the image data within the recognition areas scanned by the scanning unit against model data of a recognition target, and outputting the checking result.

4. An image recognition device comprising:
    an image data input unit for inputting image data frame by frame;
    a scanning pattern recording unit for recording a plurality of scanning patterns for directing how to skip pixels within recognition areas in the image data;
    a scanning pattern assigning unit for assigning one of the scanning patterns to each frame;

a scanning unit for scanning recognition areas within each frame according to the scanning pattern assigned to that frame;

a feature quantity calculating unit for calculating a feature quantity of image data within a recognition area;

a normalizing pattern recording unit for recording in advance a plurality of kinds of normalizing patterns corresponding to feature quantities of image data;

a normalizing pattern selecting unit for selecting from the normalizing pattern recording unit a normalizing pattern corresponding to the feature quantity calculated by the feature quantity calculating unit;

a normalization processing unit for normalizing the image data within the recognition area by using the normalizing pattern selected by the normalizing pattern selecting unit; and a checking unit for checking the image data within the recognition area scanned by the scanning unit and then normalized by the normalization processing unit, against model data of a recognition target, and outputting the checking result.

5. An image recognition device according to claim 4, further comprising:

an accumulated-image-data calculating unit for calculating accumulated image data in which each pixel value is an accumulated total of pixel values of the image data inputted from the image data input unit;

wherein the feature quantity calculating unit calculates the feature quantity of the image data within the recognition area using the accumulated image data.

6. An image recognition device according to claim 1, wherein the feature quantity is the mean of the pixel values.

7. An image recognition device according to claim 2, wherein the feature quantity is the mean of the pixel values.

8. An image recognition device according to claim 3, wherein the feature quantity is the mean of the pixel values.

9. An image recognition device according to claim 4, wherein the feature quantity is the mean of the pixel values.

10. An image recognition device according to claim 5, wherein the feature quantity is the mean of the pixel values.

11. An image recognition device according to claim 1, wherein the feature quantity is the variance of the pixel values.

12. An image recognition device according to claim 2, wherein the feature quantity is the variance of the pixel values.

13. An image recognition device according to claim 3, wherein the feature quantity is the variance of the pixel values.

14. An image recognition device according to claim 4, wherein the feature quantity is the variance of the pixel values.

15. An image recognition device according to claim 5, wherein the feature quantity is the variance of the pixel values.

16. An image recognition device according to claim 1, wherein the scanning pattern assigning unit assigns to a frame one of said scanning patterns, and to its succedent frame another, different one of said scanning patterns.

17. An image recognition device according to claim 3, wherein the scanning pattern assigning unit assigns to a frame one of said scanning patterns, and to its succedent frame another, different one of said scanning patterns.

18. An image recognition device according to claim 4, wherein the scanning pattern assigning unit assigns to a frame one of said scanning patterns, and to its succedent frame another, different one of said scanning patterns.

19. An image recognition device according to claim 5, wherein the scanning pattern assigning unit assigns to a frame one of said scanning patterns, and to its succedent frame another, different one of said scanning patterns.

* * * * *